(12) United States Patent
Bui et al.

(10) Patent No.: US 9,302,223 B2
(45) Date of Patent: Apr. 5, 2016

(54) MIXING ELEMENT

(71) Applicant: Caterpillar Inc., Peoria, IL (US)

(72) Inventors: Yung T. Bui, Peoria, IL (US); Ping Xiang, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 14/303,647

(22) Filed: Jun. 13, 2014

(65) Prior Publication Data

US 2015/0360176 A1    Dec. 17, 2015

(51) Int. Cl.
*B01D 53/94* (2006.01)
*B01F 5/00* (2006.01)
*B01F 15/02* (2006.01)
*F01N 3/24* (2006.01)

(52) U.S. Cl.
CPC .......... *B01D 53/9431* (2013.01); *B01F 5/0057* (2013.01); *B01F 15/0233* (2013.01); *B01F 2215/0001* (2013.01)

(58) Field of Classification Search
CPC . F01N 3/2066; F01N 3/2892; B01D 53/9418; B01F 15/02; B01F 5/00
See application file for complete search history.

(56) References Cited

U.S. PATENT DOCUMENTS

| | | | |
|---|---|---|---|
| 721,973 A | 3/1903 | Smith | |
| 2,141,047 A | 12/1938 | Schulte | |
| 7,104,251 B2 | 9/2006 | Kim | |
| 8,359,832 B2 * | 1/2013 | Yi et al. | 60/286 |
| 8,459,017 B2 | 6/2013 | Paterson et al. | |
| 8,999,276 B1 * | 4/2015 | Bui | 423/212 |
| 2003/0213234 A1* | 11/2003 | Funk et al. | 60/286 |
| 2009/0266064 A1* | 10/2009 | Zheng et al. | 60/317 |
| 2013/0199647 A1* | 8/2013 | Tabikh et al. | 137/896 |
| 2013/0276438 A1 | 10/2013 | De Rudder et al. | |
| 2015/0040537 A1* | 2/2015 | Hicks et al. | 60/273 |

* cited by examiner

Primary Examiner — Timothy Vanoy

(57) ABSTRACT

A mixing element positioned at an exhaust inlet of a Selective Catalytic Reduction (SCR) module is provided. The mixing element includes a base plate having a plurality of perforations thereon. The mixing element also includes a plurality of vanes connected to the base plate. Each of the plurality of vanes is spaced apart from one another. The plurality of vanes includes a plurality of flaps extending radially from the base plate. Each of the plurality of flaps has a planar configuration. The plurality of vanes also includes a plurality of blades attached to the plurality of flaps. Each of the plurality of blades extends axially with respect to an axis of the exhaust inlet. The blade has a curved configuration.

18 Claims, 6 Drawing Sheets

MIXING ELEMENT

TECHNICAL FIELD

The present disclosure relates to a mixing element for mixing two or more fluids, and more specifically to the mixing element for homogenizing a flow of the two or more fluids in an engine aftertreatment system.

BACKGROUND

A Selective Catalytic Reduction (SCR) module is typically provided in an aftertreatment system of an engine to remove or reduce nitrous oxides (NOx) emissions in an exhaust gas flow. SCR systems use one or more reductants, such as urea solution, that are introduced into the exhaust gas flow.

Mixing elements are generally used in engine aftertreatment systems to enhance mixing of the reductant and the exhaust gas. However, known mixing elements may be unable to uniformly distribute the reductant within the exhaust gas. Further, during the mixing, the reductant may contact and form deposits on surfaces of the mixing element and/or an exhaust conduit. The reductant deposits may crystallize and block passages of the mixing element and/or the exhaust conduit of the aftertreatment system. Also, the mixing elements may provide low evaporation rates, low uniformity and/or imbalance of the reductant on a downstream side of the mixing element, causing/resulting in increased back pressure across the mixing element and so on.

In some exhaust systems, the blockages may be prevented by a regeneration process in which the mixing element is heated to burn away the deposits. The regeneration process requires an additional heating arrangement to be provided on the mixing element. Further, the regeneration process may require a stipulated amount of time for completion and additional power consumption leading to reduction in overall system efficiency. The formation of deposits may lead to material wastage resulting in increased operational cost. Hence, there is a need for an improved mixing element for mixing of the two or more fluids in the aftertreatment applications.

U.S. Pat. No. 721,973 discloses a combination of a conduit through which a fluid flows and a rotary propeller wheel located within the conduit in the path of the fluid. The propeller wheel is actuated by the movement of the fluid. An agitator or a mixer is located within the conduit in the path of the fluid and in advance of the propeller wheel. The agitator is connected with and actuated by the propeller. The agitator is of less area or offers substantially less resistance to the fluid than the propeller.

SUMMARY OF THE DISCLOSURE

In one aspect of the present disclosure, a mixing element positioned at an exhaust inlet of a Selective Catalytic Reduction (SCR) module is provided. The mixing element includes a base plate having a plurality of perforations thereon. The mixing element also includes a plurality of vanes connected to the base plate. Each of the plurality of vanes is spaced apart from one another. The plurality of vanes includes a plurality of flaps extending radially from the base plate. Each of the plurality of flaps has a planar configuration. The plurality of vanes also includes a plurality of blades attached to the plurality of flaps. Each of the plurality of blades extends axially with respect to an axis of the exhaust inlet. The blade has a curved configuration.

In another aspect of the present disclosure, an aftertreatment system is provided. The aftertreatment system includes a reductant injector. The aftertreatment system also includes a Selective Catalytic Reduction (SCR) module fluidly coupled to the reductant injector via an exhaust conduit. The SCR module is positioned downstream of the reductant injector with respect to an exhaust gas flow. The aftertreatment system includes a mixing element disposed within the exhaust conduit. The mixing element is positioned upstream of the SCR module with respect to the exhaust gas flow. The mixing element includes a base plate having a plurality of perforations thereon. The mixing element also includes a plurality of vanes connected to the base plate. Each of the plurality of vanes is spaced apart from one another. The plurality of vanes includes a plurality of flaps extending radially from the base plate. Each of the plurality of flaps has a planar configuration. The plurality of vanes also includes a plurality of blades attached to the plurality of flaps. Each of the plurality of blades extends axially with respect to an axis of the exhaust conduit. Each of the plurality of blades has a curved configuration.

In yet another aspect of the present disclosure, a method is provided. The method includes receiving an exhaust gas flow on a mixing element. The method includes diverting a portion of the exhaust gas flow by a base plate and a plurality of fins of the mixing element. The method also includes introducing a swirl effect in a portion of the exhaust gas flow by a plurality of vanes of the mixing element. The method further includes discharging the exhaust gas flow away from the mixing element.

Other features and aspects of this disclosure will be apparent from the following description and the accompanying drawings.

DETAILED DESCRIPTION

Figure 1:
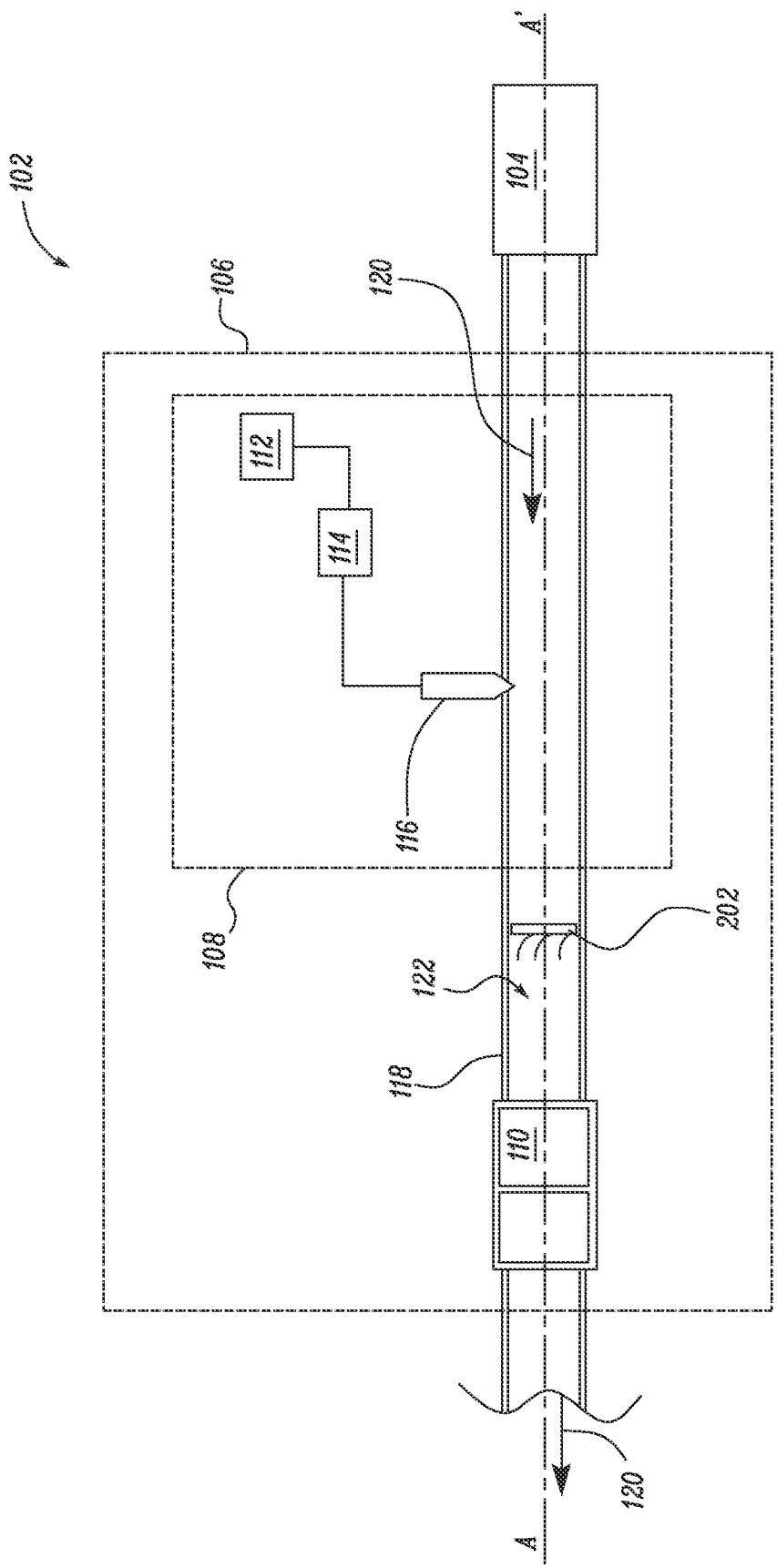
FIG. 1 is an exemplary engine system, according to an embodiment of the present disclosure.

Wherever possible, the same reference numbers will be used throughout the drawings to refer to the same or similar parts. Referring to FIG. 1, a block diagram of an exemplary engine system 102 is illustrated. The engine system 102 includes an engine 104. In one embodiment, the engine 104 includes a diesel powered engine. In other embodiments, the engine 104 may include any internal combustion engine known in the art including, but not limited to, a gasoline powered engine, a natural gas powered engine or a combination thereof. The engine 104 may include other components (not shown) such as a fuel system, an intake system, a drivetrain including a transmission system and so on. The engine 104 may be used to provide power to any machine including, but not limited to, an on-highway truck, an off-highway truck, an earth moving machine, an electric generator, and so on. Further, the engine system 102 may be associated with any industries including, but not limited to, transportation, construction, agriculture, forestry, power generation and material handling.

The engine system 102 includes an exhaust aftertreatment system 106, hereinafter referred to as "the aftertreatment system 106", fluidly connected to an exhaust manifold (not shown) of the engine 104. The aftertreatment system 106 is configured to treat an exhaust gas flow exiting the exhaust manifold of the engine 104. The exhaust gas flow contains emission compounds that may include Nitrogen Oxides (NOx), unburned hydrocarbons, particulate matter and/or other compounds. The aftertreatment system 106 is configured to treat and reduce NOx, unburned hydrocarbons, particulate matter and/or other compounds of the emissions prior to the exhaust gas flow exiting the engine system 102.

The aftertreatment system 106 may include a reductant delivery module 108. The reductant delivery module 108 is configured to dispense a reductant in the exhaust gas flow. The aftertreatment system 106 may also include a Selective Catalytic Reduction (SCR) module 110 provided downstream of the reductant delivery module 108. The SCR module 110 is configured to reduce a concentration of NOx present in the exhaust gas flow. The SCR module 110 may include a catalyst for facilitating the reaction, reduction, or removal of NOx from the exhaust gas flow passing through the SCR module 110. The SCR module 110 may have a honeycomb or other structure made from or coated with an appropriate material. The material may be an oxide, such as vanadium oxide or tungsten oxide, coated on an appropriate substrate, such as titanium dioxide.

In one embodiment, the aftertreatment system 106 may include a filter (not shown), generally a Diesel Particulate Filter (DPF), provided upstream of the SCR module 110. The DPF may be coated with a suitable catalyst to promote oxidation of any particulate matter in the exhaust gas flow that may be trapped in the DPF. Additionally, in another embodiment, the aftertreatment system 106 may further include a Diesel Oxidation Catalyst (DOC). In such an exemplary embodiment, the DOC may be followed downstream by the SCR module 110. Alternatively, the aftertreatment system 106 may omit the DPF and include only the SCR module 110. In yet another exemplary embodiment, a combined DPF/SCR catalyst (not shown) may be used.

Further, the aftertreatment system 106 may include one or more NOx sensors (not shown). The NOx sensors may be located at varying locations within the aftertreatment system 106. For example, the NOx sensors may be located upstream and/or downstream of the SCR module 110. The NOx sensors may be configured to measure the concentration of NOx compounds in the exhaust gas flow passing through the aftertreatment system 106. Similarly, other additional sensors such as a pressure sensor and a temperature sensor may also be included without any limitation.

The aftertreatment system 106 disclosed herein is exemplary. A person of ordinary skill in the art will appreciate that the aftertreatment system 106 may be disposed in various arrangements and/or combinations relative to the exhaust manifold. The aforementioned variations in position and the components included in the aftertreatment system 106 are possible without deviating from the scope of the disclosure and various other configurations not disclosed herein are also possible within the scope of this disclosure.

As shown in FIG. 1, the reductant delivery module 108 may include a storage tank 112, a pump 114 and a reductant injector 116 for supplying the reductant in an exhaust conduit 118 of the engine system 102. The reductant injector 116, hereinafter referred to as "the injector 116", is mounted on the exhaust conduit 118 in a manner such that the injector 116 may dispense the reductant in a direction substantially perpendicular or inclined to a direction 120 of the exhaust gas flow.

The storage tank 112 is in fluid communication with the injector 116 through the pump 114. The storage tank 112 is configured to store the reductant therein. The reductant may be a fluid such as a Diesel Exhaust Fluid (DEF), comprising urea. Alternatively, the reductant may include ammonia or any other reducing agent. Parameters related to the storage tank 112 such as size, shape, location, and material used may vary according to system design and requirements.

The pump 114 is configured to pressurize and selectively deliver the reductant from the storage tank 112 into the exhaust conduit 118 through the injector 116. The pump 114 may be any pump known in the art including, but not limited to, a piston pump, a centrifugal pump and so on. The exhaust conduit 118 is fluidly connected to the exhaust manifold, the injector 116 and the SCR module 110. The exhaust conduit 118 is configured to provide a passage 122 to receive the exhaust gas flow.

Figure 2:
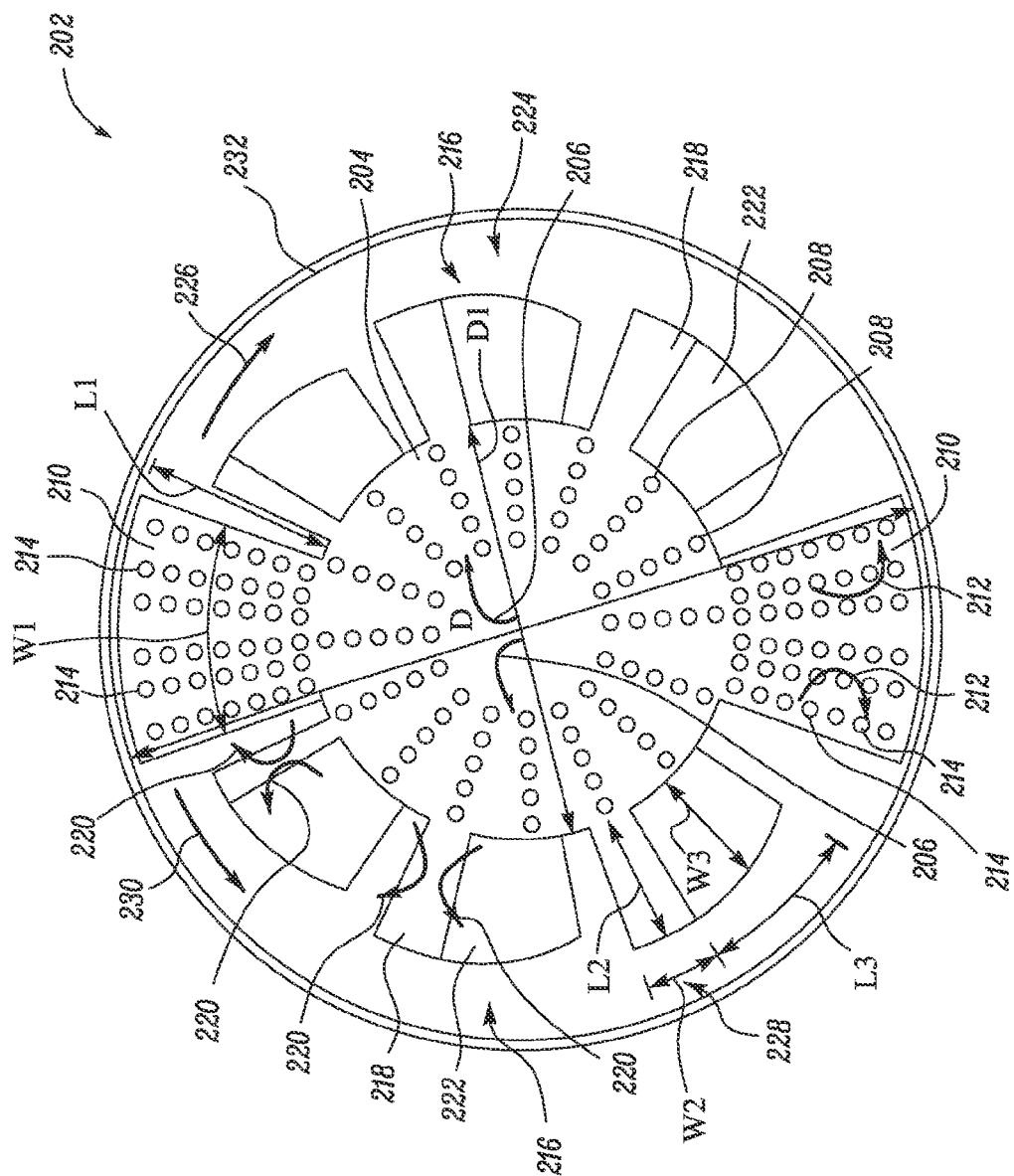
FIG. 2 is a front view of a mixing element, according to an embodiment of the present disclosure.

The present disclosure relates to a mixing element 202 disposed within the exhaust conduit 118. Referring to FIG. 2, a front view of the mixing element 202 positioned within the exhaust conduit 118 is illustrated. More specifically, the mixing element 202 is provided within the exhaust conduit 118 upstream of the SCR module 110 and downstream of the injector 116. Accordingly, the exhaust conduit 118 may be interchangeably referred to as an exhaust inlet 118 of the SCR module 110. Further, the mixing element 202 is disposed substantially perpendicular to the direction 120 (see FIG. 1) of the exhaust gas flow. The mixing element 202 is configured to mix the reductant supplied by the injector 116 with the exhaust gas flow.

The mixing element 202 includes a base plate 204. The base plate 204 is configured to provide a resistance to the exhaust gas flow. The base plate 204 is configured to divert a portion of the exhaust gas flow substantially perpendicular to the base plate 204 as shown by arrows 206. This in turn provides turbulence in the exhaust gas flow. The base plate 204 has a circular, planar configuration defining a diameter "D1". The diameter "D1" of the base plate 204 is lesser than a diameter "D" of the exhaust conduit 118 (shown in FIG. 1). In other embodiments, the base plate 204 may have any other shape, such as, a polygonal configuration.

The base plate 204 is disposed substantially perpendicular to the direction 120 of the exhaust gas flow. The base plate 204 includes a plurality of perforations 208 provided thereon. The perforations 208 are configured to bypass a portion of the exhaust gas flow through the base plate 204. Additionally, the perforations 208 may be configured to reduce a backpressure in the exhaust gas flow upstream of the mixing element 202.

As illustrated, each of the plurality of perforations 208 has a circular configuration. In other embodiments, the perforations 208 may have any other configuration, such as, polygonal. In yet another embodiment, the perforation 208 may be embodied as a single hole 430 (shown in FIG. 4) disposed on the base plate 204. The hole 430 may be positioned centrally or at an offset from a center of the base plate 204.

The mixing element 202 includes a fin 210 extending radially from the base plate 204. The fin 210 is configured to provide a resistance to the exhaust gas flow. The fin 210 is configured to divert a portion of the exhaust gas flow substantially perpendicular to the fin 210 as shown by arrows 212. This in turn may introduce turbulence in the exhaust gas flow. In one embodiment, the mixing element 202 includes a pair of the fins 210 extending from diametrically opposed locations on the base plate 204. In other embodiments, the mixing element 202 may include any number of fins 210 extending radially from the base plate 204. The fins 210 may be positioned at any other locations on the base plate 204 without any limitations. For example, in one embodiment, the base plate 204 may include three fins 210 extending radially from the base plate 204 and positioned on the base plate 204 circumferentially equidistant from one another. In another embodiment, the base plate 204 may include four fins 210 extending radially from the base plate 204 and positioned on the base plate 204 circumferentially equidistant from one another.

The fin 210 has a planar configuration defining a length "L1" and a width "W1". The width "W1" increases along the length "L1" and away from the base plate 204. In other embodiments, the width "W1" of the fin 210 may decrease along the length "L1" and away from the base plate 204. In yet other embodiments, the width "W1" of the fin 210 may be constant along the length "L1". It should be noted that the length "L1" and the width "W1" of the fin 210 may vary based on system design and requirements.

Further, the fin 210 is coplanar with respect to the base plate 204. In other embodiments, the fin 210 may be disposed angularly with respect to a plane of the base plate 204. The fin 210 may include a plurality of holes 214 provided thereon. The holes 214 are configured to bypass a portion of the exhaust gas flow through the fin 210. The holes 214 may further be configured to reduce the backpressure in the exhaust gas flow upstream of the mixing element 202.

Each of the plurality of holes 214 has a circular configuration. In other embodiments, the holes 214 may have any other configuration. In yet another embodiment, the fin 210 may include a single hole 214 positioned centrally or at an offset from a center of the fin 210.

The mixing element 202 includes a plurality of vanes 216 connected to the base plate 204. Each of the plurality of vanes 216 are provided on the base plate 204 circumferentially spaced apart from one another. Each of the plurality of vanes 216 includes a flap 218 extending radially from the base plate 204. The flap 218 is configured to provide a resistance to the exhaust gas flow. The flap 218 is configured to divert a portion of the exhaust gas flow substantially perpendicular to the flap 218 as shown by arrows 220. This in turn may introduce turbulence in the exhaust gas flow. The flap 218 has a planar configuration defining a length "L2" and a width "W2".

The width "W2" of the flap 218 is constant along the length "L2". In other embodiments, the width "W2" of the flap 218 may decrease along the length "L2" and away from the base plate 204. In yet other embodiments, the width "W2" may increase along the length "L2" and away from the base plate 204. It should be noted that the length "L2" and the width "W2" of the flap 218 of each of the plurality of vanes 216 may vary or may be equal based on system design and requirements.

The flap 218 may be coplanar with respect to the base plate 204 and/or the fin 210. In another embodiment, the flap 218 may be disposed angularly with respect to the plane containing the base plate 204 and/or the fin 210. The flap 218 may include a plurality of holes (not shown) provided thereon. The holes may be configured to bypass a portion of the exhaust gas flow through the flap 218. The holes may be further configured to reduce the backpressure in the exhaust gas flow upstream of the mixing element 202.

Each of the plurality of vanes 216 of the mixing element 202 further includes a blade 222 attached to the flap 218. The blade 222 is configured to introduce a swirl effect in the exhaust gas flow downstream of the mixing element 202, as shown by arrows 330 (shown in FIG. 3). The blade 222 is positioned on the flap 218 in a manner such that the blade 222 extends axially with respect to an axis A-A' (shown in FIG. 1) of the exhaust inlet 118. The blade 222 has a curved configuration defining a vane angle "V" (shown in FIG. 3), a length "L3" and a width "W3".

The width "W3" of the blade 222 is constant along the length "L3". In other embodiments, the width "W3" of the blade 222 may decrease along the length "L3" and away from the flap 218. In yet other embodiments, the width "W3" may increase along the length "L3" and away from the flap 218. In one embodiment, the vane angle "V" of the blade 222 of each of the plurality of vanes 216 may be different from each other. In another embodiment, the vane angle "V" of the blade 222 of each of the plurality of vanes 216 may be equal. It should be noted that the length "L3", the width "W3" and/or the vane angle "V3" of the blade 222 of each of the plurality of vanes 216 may vary or may be equal based on system design and requirements. In some embodiments, the blade 222 may include a plurality of holes (not shown) provided thereon for bypassing a portion of the exhaust gas flow and/or reducing the backpressure in the exhaust gas flow upstream of the mixing element 202. The shape, location and number of the holes may vary based on the application.

The orientation of the vanes may vary. A first set 224 of the vanes 216 may be provided such that the blade 222 of each of the first set 224 of the vanes 216 has a pitch oriented in a clockwise direction 226 as viewed from a first direction 332 (shown in FIG. 3) perpendicular to the base plate 204. Accordingly, the first set 224 of the vanes 216 may provide the swirl effect oriented in the clockwise direction 226 with respect to the exhaust gas flow downstream of the mixing element 202.

Further, a second set 228 of the vanes 216 may be provided in a manner such that each of the second set 228 of the vanes 216 has a pitch oriented in a counter clockwise direction 230 as viewed from the first direction 332 perpendicular to the base plate 204. Accordingly, the second set 228 of the vanes 216 may provide the swirl effect oriented in the counter clockwise direction 230 with respect to the exhaust gas flow downstream of the mixing element 202. In another embodiment, both the first and second sets 224, 228 of the vanes 216 may have the pitch oriented in either the clockwise or the counter clockwise direction 226, 230 as viewed from the first direction 332 perpendicular to the base plate 204.

It should be noted that number and/or configuration of the plurality of vanes 216, plurality of fins 210 and/or the base plate 204 of the mixing element 202 may vary based on different parameters. The parameters may include, but not limited to, an allowable backpressure upstream of the mixing element 202, an intensity of resistance and turbulence provided in the exhaust gas flow and an intensity of the swirl effect in the exhaust gas flow downstream of the mixing element 202.

The mixing element 202 may be formed from any metal or an alloy known in the art. The mixing element 202 may be formed by any manufacturing process known in the art such as stamping, shearing, cutting, bending and so on. The mixing element 202 may be affixed to the exhaust conduit 118 by attaching the fin 210 to a wall 232 of the exhaust conduit 118. In other embodiments, the mixing element 202 may be affixed to the exhaust conduit 118 by attaching one or more flaps 218 of the plurality of vanes 216 to the wall 232 of the exhaust conduit 118. The mixing element 202 may be affixed to the exhaust conduit 118 by any known fastening methods such as bolting, riveting, welding, soldering, brazing and other such methods.

Figure 3:
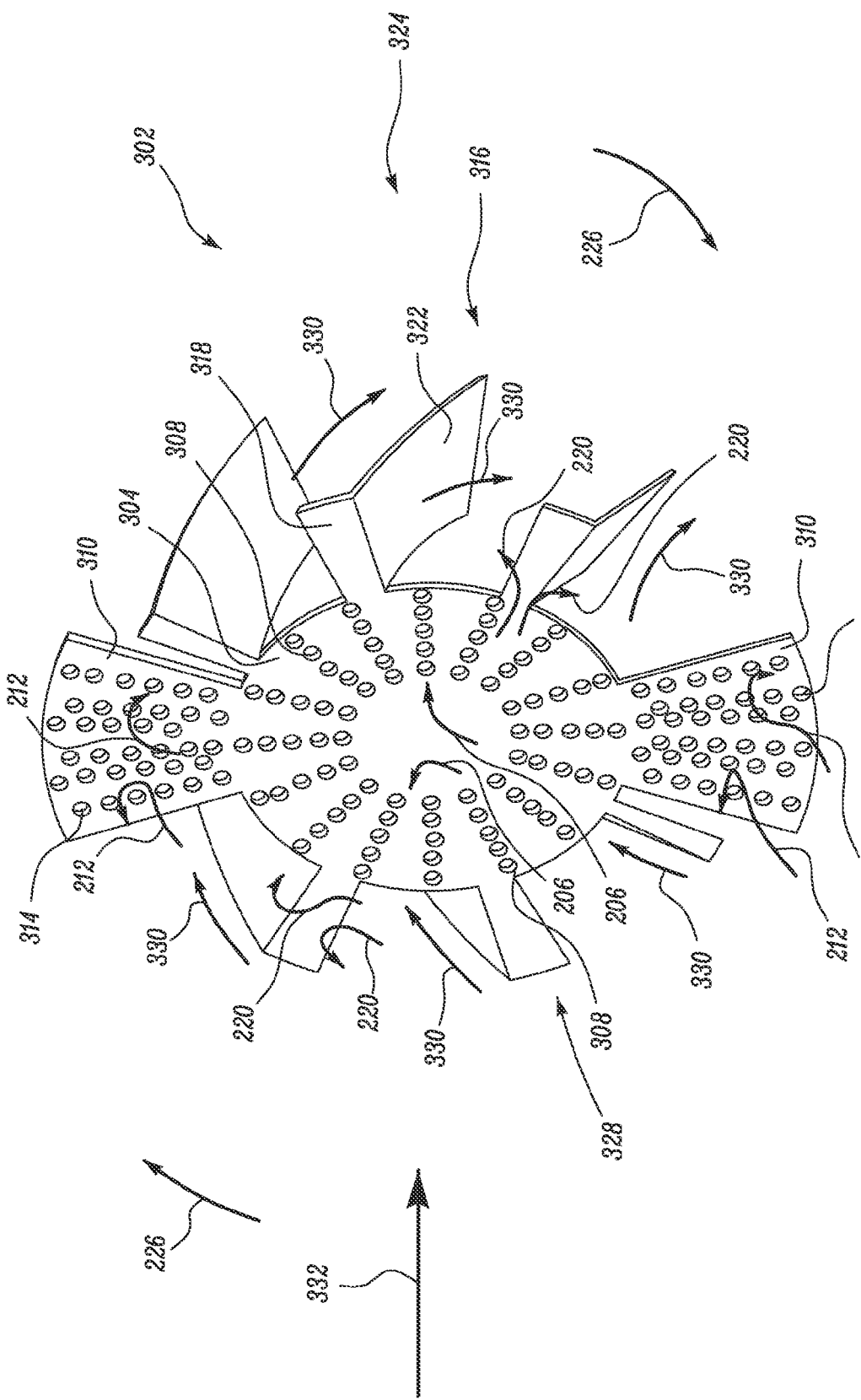
FIG. 3 is a perspective view of another embodiment of the mixing element.

Referring to FIG. 3, a perspective view of another embodiment of the mixing element 302 is illustrated. The mixing element 302 includes the base plate 304 having the plurality of perforations 308 provided thereon. The mixing element 302 includes the plurality of fins 310 having a configuration similar to a configuration of the base plate 204 and the plurality of fins 210 respectively of the embodiment of the mixing element 202 described in relation to FIG. 2. Each of the plurality of fins 310 include the plurality of holes 314 provided thereon. The mixing element 302 also includes the plurality of vanes 316 connected to the base plate 304. Each of the plurality of vanes 316 includes the flap 318 and the blade 322 connected to the flap 318. As shown, the first set 324 of the plurality of vanes 316 have the pitch oriented in the clockwise direction 226 as viewed from the first direction 332 perpendicular to the base plate 204. The second set 328 of the plurality of vanes 316 also have the pitch oriented in the clockwise direction 226 as viewed from the first direction 332 perpendicular to the base plate 204.

Figure 4:
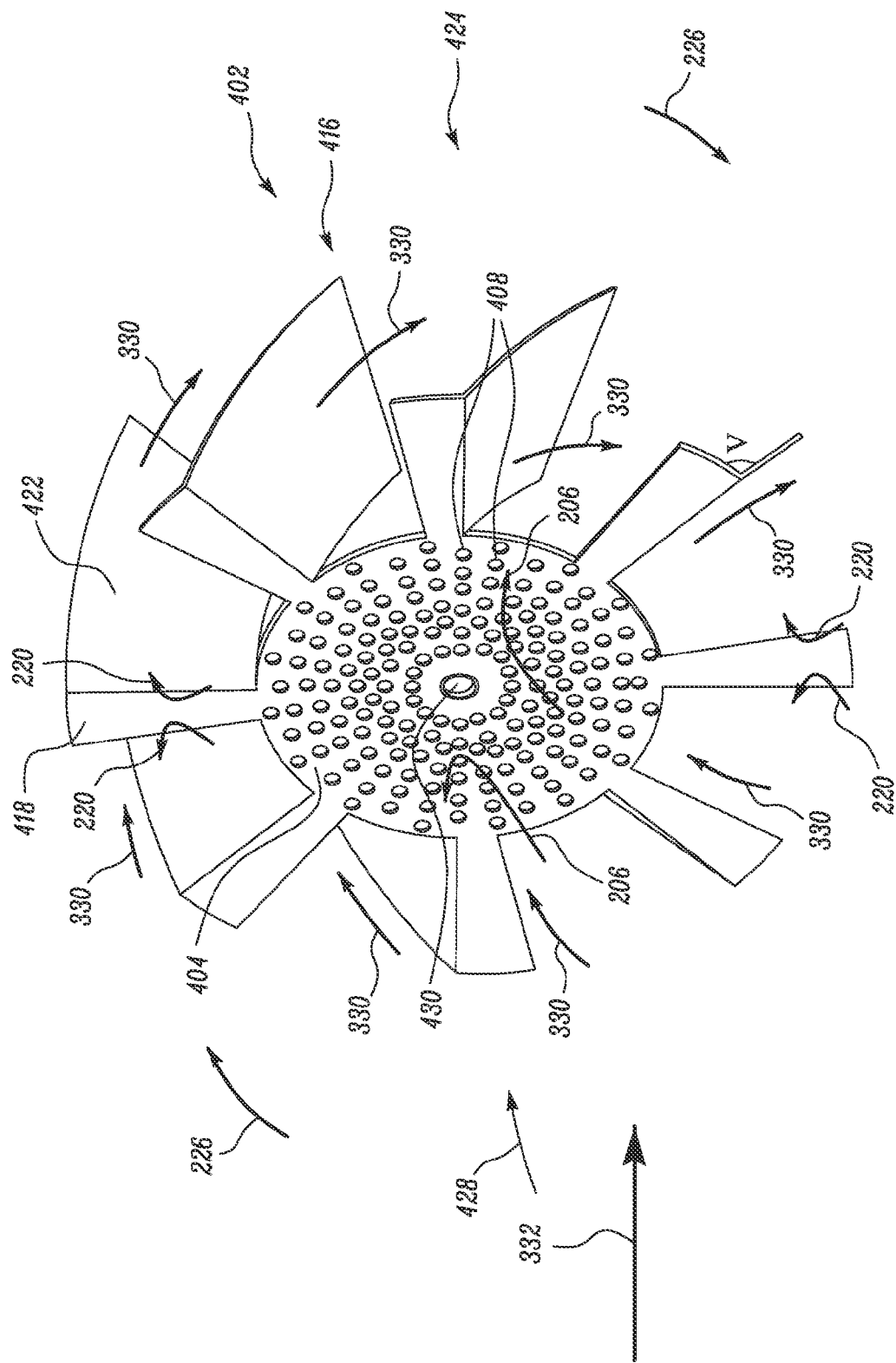
FIG. 4 is a perspective view of another embodiment of the mixing element.

Referring to FIG. 4, a perspective view of another embodiment of the mixing element 402 is illustrated. The mixing element 402 includes the base plate 404 having a configuration similar to the configuration of the base plate 204 of the embodiment of the mixing element 202 described in relation to FIG. 2. Additionally, the base plate 404 includes the single hole 430 and the plurality of perforations 408 provided thereon. The fins 210 are absent. The mixing element 402 includes the plurality of vanes 416 connected to the base plate 404. The plurality of vanes 404 have a configuration similar to a configuration of the plurality of vanes 316 of the embodiment of the mixing element 302 described in relation to FIG. 3. Each of the plurality of vanes 416 includes the flap 418 and the blade 422 connected to the flap 418. As shown, the first set 424 of the plurality of vanes 416 have the pitch oriented in the clockwise direction 226 as viewed from the first direction 332 perpendicular to the base plate 204. The second set 428 of the plurality of vanes 416 also have the pitch oriented in the clockwise direction 226 as viewed from the first direction 332 perpendicular to the base plate 204.

Figure 5:
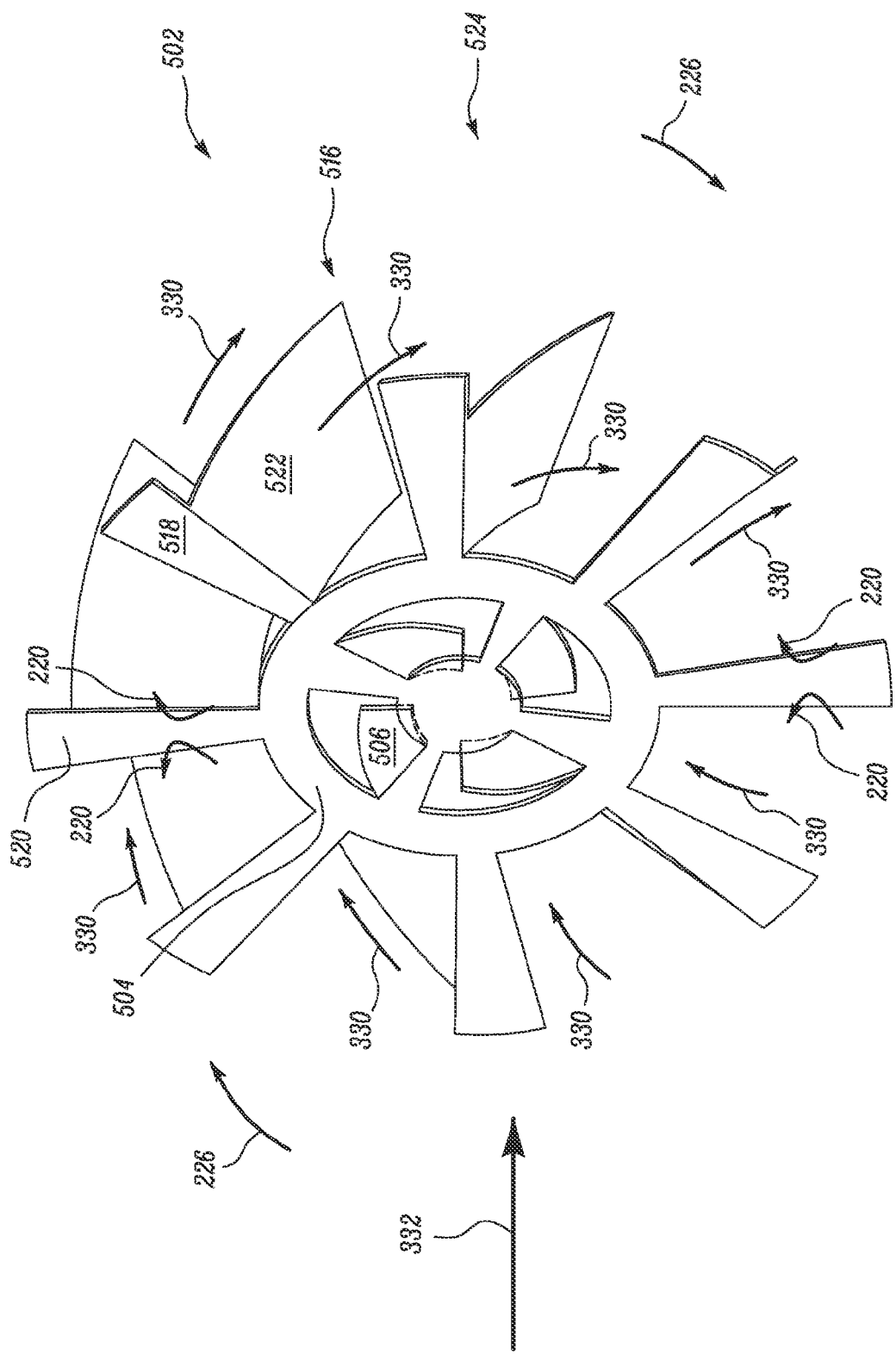
FIG. 5 is a perspective view of yet another embodiment of the mixing element.

Referring to FIG. 5, a perspective view of yet another embodiment of the mixing element 502 is illustrated. The mixing element 502 includes the base plate 504 having a plurality of tabs 506 punched out from the base plate 504. More specifically, the plurality of tabs 506 extends downstream and away from the base plate 504. The plurality of tabs 506 is configured to provide the swirl effect to the exhaust gas flow downstream of the mixing element 502. It should be noted that number, location and/or dimension of the plurality of tabs 506 may vary based on system design and requirements and may not limit the scope of the disclosure.

The mixing element 502 includes the plurality of vanes 516 connected to the base plate 504. The plurality of vanes 516 have a configuration similar to a configuration of the plurality of vanes 316 of the embodiment of the mixing element 302 described in relation to FIG. 3. Each of the plurality of vanes 516 includes the flap 518 and the blade 522 connected to the flap 518. The flaps 518 have a projection 520 extending radially away from the base plate 504. The projections 520 are configured to enable affixing of the mixing element 502 to the wall 232 of the exhaust conduit 118. As shown, the first set 524 of the plurality of vanes 516 have the pitch oriented in the clockwise direction 226 as viewed from the first direction 332 perpendicular to the base plate 204. The second set 528 of the plurality of vanes 516 also have the pitch oriented in the clockwise direction 226 as viewed from the first direction 332 perpendicular to the base plate 204.

INDUSTRIAL APPLICABILITY

The design of the mixing elements used for mixing of the exhaust gas and the reductant is such that the reductant may contact inner surfaces of the mixing element during the injection of the reductant and/or during the mixing process. After continuous operation of the mixing element, the reductant may form deposits on the inner surfaces of the mixing element and/or the wall of the exhaust conduit. In systems where the mixing element is installed in the exhaust conduit, the mixing of the reductant and the exhaust gas flow may be non-uniform in different flow rate conditions of the exhaust gas flow.

The present disclosure provides the mixing element 202, 302, 402, 502 having improved breakup of reductant droplets and improved evaporation rate. The mixing element 202, 302, 402, 502 may be calibrated to be used in different configurations of the injector 116 and/or the exhaust conduit 118. For example, the mixing element 202, 302, 402, 502 may be modified and calibrated based on location and/or orientation of the injector 116, straight length of the exhaust conduit 118, the diameter "D" of the exhaust conduit 118, the allowable backpressure in the exhaust conduit 118 and so on. Further, the mixing element 202, 302, 402, 502 may provide reduced reductant deposition, ease in manufacturability and reduced weight leading to overall reduction in system weight.

Figure 6:
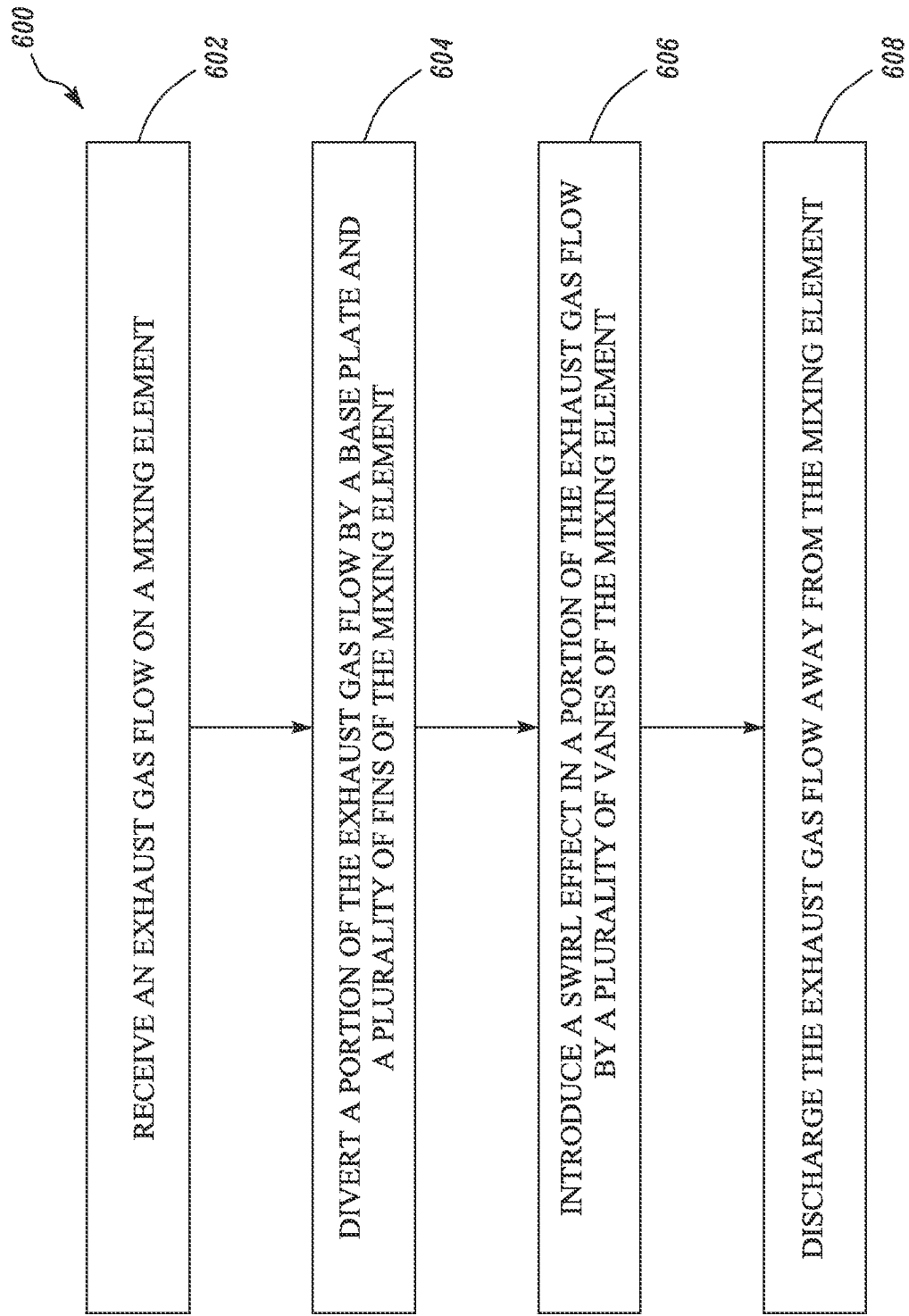
FIG. 6 is a flowchart of a method of mixing of fluids, according to an embodiment of the present disclosure.

A method 600 of mixing of fluids will be discussed in relation to FIG. 6. At step 602, the mixing element 202, 302, 402, 502 receives the exhaust gas flow from the exhaust manifold of the engine 104. At step 604, the base plate 204, 304, 404, 504 and the fin 210, 310 diverts the portion of the exhaust gas flow. The diverting of the portion of the exhaust gas flow may create turbulence in the exhaust gas flow.

At step 606, the plurality of vanes 216, 316, 416, 516 introduce the swirl effect in the portion of the exhaust gas flow downstream of the mixing element 202, 302, 402, 502. The swirl effect provides increased turbulence in the exhaust gas flow and improved mixing and evaporation rate of the reductant. At step 608, the mixing element 202, 302, 402, 502 discharges away the exhaust gas flow and is received in the SCR module 110 or any other component of the aftertreatment system 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mixing element positioned at an exhaust inlet of a Selective Catalytic Reduction (SCR) module, the mixing element comprising:
   a base plate having a plurality of perforations thereon; and
   a plurality of vanes connected to the base plate, each of the plurality of vanes being spaced apart from one another, the plurality of vanes comprising:
      a plurality of flaps extending radially from the base plate, wherein each of the plurality of flaps has a planar configuration; and
      a plurality of blades attached to the plurality of flaps, each of the plurality of blades extending axially with respect to an axis of the exhaust inlet, each of the plurality of blades having a curved configuration.

2. The mixing element of claim 1, wherein the base plate defines a centrally disposed single hole therein.

3. The mixing element of claim 1 further comprising a plurality of fins extending radially from the base plate, each of the plurality of fins having a planar configuration.

4. The mixing element of claim 3, wherein the plurality of fins includes a first fin and second fin such that the first fin and the second fin extend from diametrically opposed locations on the base plate.

5. The mixing element of claim 3, wherein at least one of the plurality of fins define a plurality of through holes therein.

6. The mixing element of claim 1, wherein at least one of the plurality of flaps define a plurality of through holes therein.

7. The mixing element of claim 1, wherein at least one of the plurality of blades define a plurality of through holes therein.

8. The mixing element of claim 1, wherein a pitch of each of the plurality of vanes as viewed from a first direction perpendicular to the base plate is any one of:
a clockwise direction; and
a counter clockwise direction.

9. The mixing element of claim 1, wherein each of the plurality of perforations includes a tab punched out from the base plate.

10. An aftertreatment system comprising:
a reductant injector;
a Selective Catalytic Reduction (SCR) module fluidly coupled to the reductant injector via an exhaust conduit, the SCR module positioned downstream of the reductant injector with respect to an exhaust gas flow; and
a mixing element disposed within the exhaust conduit, the mixing element positioned upstream of the SCR module with respect to the exhaust gas flow, the mixing element comprising:
a base plate having a plurality of perforations thereon; and
a plurality of vanes connected to the base plate, each of the plurality of vanes being spaced apart from one another, the plurality of vanes comprising:
a plurality of flaps extending radially from the base plate, wherein each of the plurality of flaps has a planar configuration; and
a plurality of blades attached to the plurality of flaps, each of the plurality of blades extending axially with respect to an axis of the exhaust conduit, each of the plurality of blades having a curved configuration.

11. The aftertreatment system of claim 10, wherein a diameter of the base plate is lesser than a diameter of the exhaust conduit.

12. The aftertreatment system of claim 10, wherein the base plate of the mixing element is disposed perpendicular to the exhaust gas flow.

13. The aftertreatment system of claim 10 further comprising a plurality of fins extending radially from the base plate, each of the plurality of fins having a planar configuration.

14. The aftertreatment system of claim 13, wherein at least one of the plurality of fins is attached to a wall of the exhaust conduit.

15. The aftertreatment system of claim 10, wherein at least one of the plurality of flaps is attached to a wall of the exhaust conduit.

16. The aftertreatment system of claim 10, wherein the base plate defines a centrally disposed single hole therein.

17. The aftertreatment system of claim 10, wherein each of the plurality of perforations includes a tab punched out from the base plate.

18. The aftertreatment system of claim 10, wherein a pitch of each of the plurality of vanes as viewed from a first direction perpendicular to the base plate is any one of:
a clockwise direction; and
a counter clockwise direction.

* * * * *